March 10, 1970 R. C. HANSFORD 3,499,835
HYDROCRACKING AMMONIA-CONTAINING HYDROCARBONS IN THE PRESENCE
OF A CATALYST COMPRISING A GROUP VIII METAL DEPOSITED
ON A RARE-EARTH EXCHANGE X ZEOLITE
Filed May 15, 1967
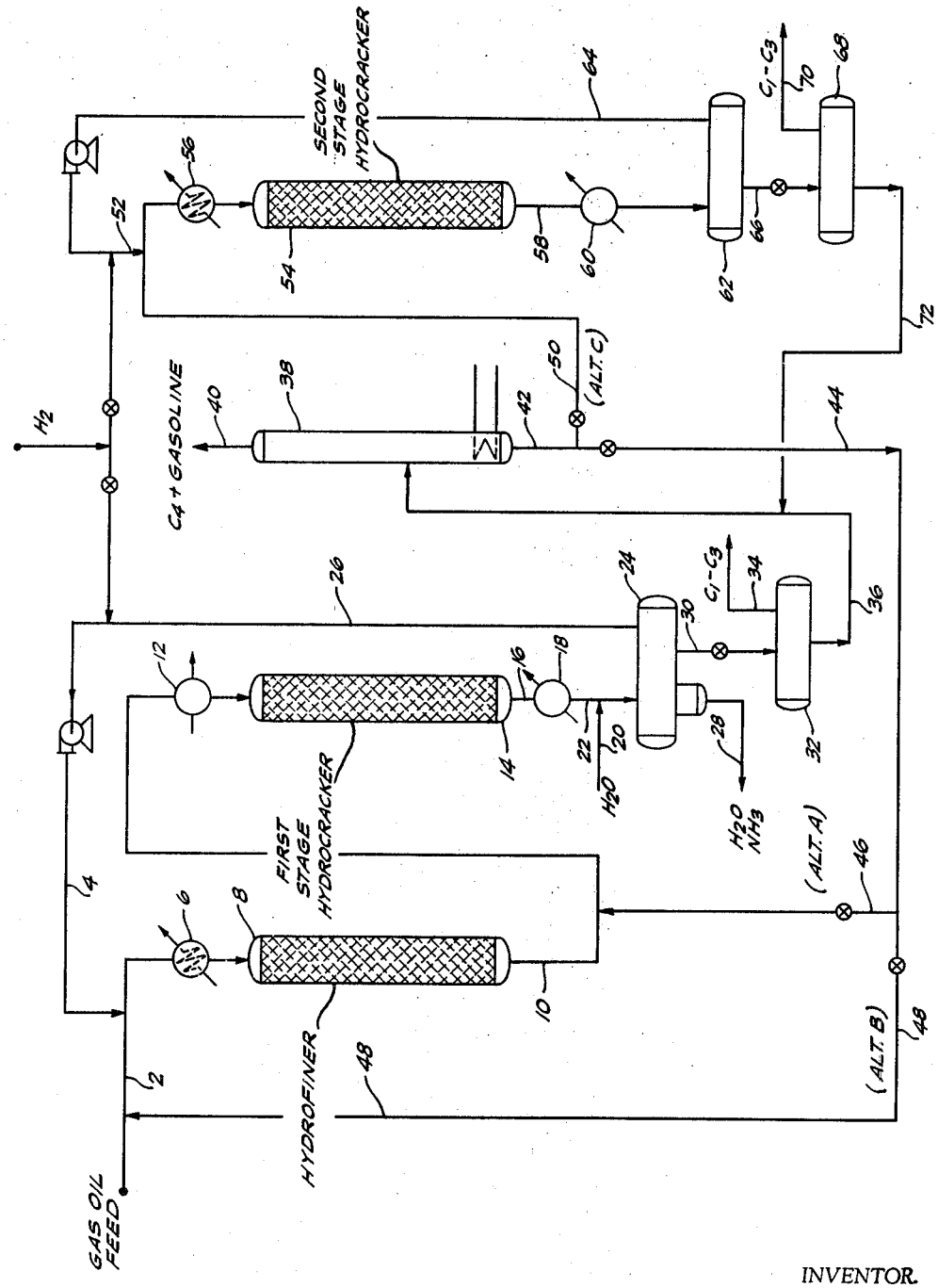
INVENTOR.
ROWLAND C. HANSFORD
BY
Lannas S. Henderson
ATTORNEY United States Patent Office 3,499,835
Patented Mar. 10, 1970

3,499,835
HYDROCRACKING AMMONIA-CONTAINING HYDROCARBONS IN THE PRESENCE OF A CATALYST COMPRISING A GROUP VIII METAL DEPOSITED ON A RARE-EARTH EXCHANGE X ZEOLITE
Rowland C. Hansford, Yorba Linda, Calif., assignor to Union Oil Company of California, Los Angeles, Calif., a corporation of California
Continuation-in-part of application Ser. No. 433,178, Feb. 16, 1965. This application May 15, 1967, Ser. No. 638,437
Int. Cl. C10g 23/04, 13/04
U.S. Cl. 208—111                                        13 Claims

ABSTRACT OF THE DISCLOSURE

A mineral oil feedstock containing organic nitrogen compounds is first subjected to catalytic hydrofining to effect denitrogenation, and the resulting ammonia-containing effluent is then subjected to hydrocracking in contact with an ammonia-resistant catalyst comprising a Group VIII metal-promoted rare earth zeolite of the X crystal tape. In a preferred modification, the remaining unconverted oil is hydrocracked in a second stage, substantially in the absence of ammonia, in contact with a Group VIII metal-promoted hydrogen zeolite of the Y crystal type.

This application is a continuation-in-part of application Ser. No. 433,178, filed Feb. 16, 1965, now abandoned.

BRIEF DESCRIPTION OF DRAWINGS

The attached drawing is a schematic flow diagram illustrating the invention in its preferred, two-stage modification.

BACKGROUND AND SUMMARY OF THE INVENTION

This invention relates to novel methods for carrying out the catalytic hydrocracking of nitrogen-containing hydrocarbon feedstocks to produce therefrom lower boiling hydrocarbons, boiling for example in the gasoline or jet fuel range. The process is designed especially for the hydrocracking of refractory mineral oil feedstocks comprising organic nitrogen compounds and heavy hydrocarbons boiling above about 700° F., while maintaining the catalyst at high activity levels for relatively long periods of time between regenerations.

Briefly, the process comprises first subjecting the feed to a catalytic prehydrogenation, or "hydrofining" treatment at elevated temperatures and pressures to effect decomposition of organic nitrogen and sulfur compounds, then subjecting the ammonia-containing hydrofining effluent to catalytic hydrocracking in the presence of a catalyst comprising a Group VIII hydrogenating metal component, preferably a Group VIII noble metal, supported on a crystalline zeolite cracking base of the X crystal type wherein the zeolitic cations are predominantly rare earth metal ions. The effluent from this hydrocracking step is then condensed and purified, as by washing with water to remove ammonia, and fractionated to recover the desired products. The unconverted residue may then be reheated and recycled to the hydrocracker, or to the hydrofiner, or it may be hydrocracked in a second-stage hydrocracking zone containing either a rare earth X zeolite catalyst similar to that employed in the first zone, or a Group VIII metal-promoted hydrogen zeolite of the Y crystal type, preferably the latter.

If two hydrocracking stages are employed, the condensed and depressured effluent from both stages may, if desired, be admixed and fractionated to recover the net gasoline production from both stages, and the unconverted oil from both stages. The unconverted oil is then preferably recycled to the second hydrocracking stage.

As a result of the increasing demand for light motor fuels, and the decreasing demand for heavier petroleum products such as fuel oil and the like, there is much current interest in more efficient methods for converting the heavier products of refining into gasoline. The conventional methods of accomplishing this such as catalytic cracking, coking, thermal cracking and the like always result in the production of a more highly refractory unconverted oil, or cycle oil, which heretofore could not be economically converted to gasoline. It is known that such refractory materials can be converted to gasoline by catalytic hydrocracking. However, the application of the hydrocracking technique has in the past been very limited due to the expense involved, especially with respect to heavy, nitrogen-containing feedstocks.

The principal problem in hydrocracking these heavy nitrogen-containing feeds centers around the troublesome dilemma of how to make the catalyst work efficiently, i.e., give high conversions per unit of catalyst, without undergoing rapid deactivation by nitrogen compounds, and without resorting to expensive, separate prehydrofining to remove nitrogen. Previous attempts to apply hydrocracking have failed in at least one of these respects.

In U.S. Patent No. 3,159,568 to Price et al. it is shown that the expensive separate prehydrofining of nitrogen-containing feedstocks can be avoided by adopting the "integral" hydrofining-hydrocracking system. In this system, the feed is first subjected to conventional catalytic hydrofining, and the effluent therefrom is transferred directly to the hydrocracker without the intervening condensation, washing to remove ammonia, reheating and repressuring steps which constitute a major portion of the expense involves in conventional, non-integral prehydrofining.

This integral system provides a major saving in capital investment and operating expenses, due to the elimination of interstage treatment between the hydrofiner and the hydrocracker. However, conventional hydrocracking catalysts of the silica-alumina cogel type are fairly rapidly deactivated by the ammonia introduced from the hydrofiner. The newer zeolite type catalysts, disclosed generally in the above Price et al. patent, are much more effective as a class in maintaining their activity in the presence of ammonia. It has now been discovered however that the rare earth metal X zeolites function more effectively, i.e. at lower temperatures and with lower initial deactivation rates, in the presence of ammonia than do other zeolite catalysts which display equal or superior activity in the absence of ammonia. Specifically, on the basis of equal Group VIII metal contents, these rare earth X zeolite catalysts have been found to be more active than the corresponding rare earth Y zeolites, than hydrogen Y zeolites, than hydrogen X zeolites and than other polyvalent metal forms of either X or Y zeolites. This is a surprising discovery in that the hydrogen and/or polyvalent metal Y zeolite catalysts are equal or superior to the rare earth X zeolite for hydrocracking in the absence of ammonia. However, in order to obtain maximum activity per weight unit of catalyst, it has been found that the rare earth metal equivalent exchanged into the X zeolite must correspond to at least about 70%, preferably at least about 80%, of the total ion exchange capacity. This is because of two factors: Firstly, the alkali metal, as well as most polyvalent metal forms of X zeolite have a very low hydrocracking activity. Secondly, the hydrogen form of X zeolite is not capable of existence in a stable crystalline form. As a result, any substantial portion of the X zeolite which is left in a hydrogen form, or a metal form other than rare earth, acts simply as an inert diluent in the catalyst.

Hence, in order to obtain maximum catalyst activity in the first hydrocracking stage of the process, it is necessary to use an X zeolite which has been exhaustively exchanged with rare earth metal.

This latter restriction however does not necessarily apply in the second stage of the process, for here a Y zeolite catalyst can be used with equal or superior results. The Y zeolite is relatively stable and highly active in its hydrogen form, and the polyvalent metal forms in general are both stable and active. Hence, in the second stage of the process a Y zeolite catalyst may be employed containing econmoical proportions and types of zeolitic cations, e.g. hydrogen ions, magnesium ions, calcium ions, zinc ions, manganese ions, and the like.

DETAILED DESCRIPTION (A) *Process description.*—The process will now be described in more detail with reference to the attached drawing, which illustrates the invention in its major modifications. The initial gas oil feedstock is brought in through line 2 and blended with fresh and recycle hydrogen from line 4. The mixture is then preheated to suitable hydrofining temepratures in preheater 6, and passed into catalytic hydrofiner 8.

In hydrofiner 8 the feed plus hydrogen is contacted with a suitable sulfactive hydrofining catalyst under conditions of hydrofining. The catalyst may comprise any of the oxides and/or sulfides of the transitional metals, and especially an oxide or sulfide of a Group III metal (particularly cobalt or nickel) mixed with an oxide or sulfide of a Group VI-B metal (preferably molybdenum or tungsten). Such catalysts preferably are supported on an adsorbent carrier in proportions ranging between about 2% and 25% by weight. Suitable carriers include in general the difficulty reducible inorganic oxides, e.g., alumina, silica, zirconia, titania, clays such as bauxite, bentonite, etc. Preferably the carrier should display little or no cracking activity, and hence highly acidic carriers having a Cat-A cracking activity above about 20 are to be avoided. The preferred carrier is activated alumina, and especially activated alumina containing about 3–15% by weight of coprecipitated silica gel.

The preferred hydrofining catalyst consists of nickel sulfide or oxide plus molybdenum sulfide or oxide supported on silica-stabilized alumina. Compositions containing between about 1% and 5% of Ni, 3% and 20% of Mo, 3% and 15% of $SiO_2$, and the balance $Al_2O_3$, and wherein the atomic ratio of Ni/Mo is between about 0.2 and 4, are specifically contemplated.

Suitable hydrofining conditions are as follows:

| | Broad range | Preferred range |
|---|---|---|
| Average bed temp., °F | 550–900 | 650–800 |
| Pressure, p.s.i.g. | 500–4,000 | 1,000–3,000 |
| Liquid hourly space velocity | 0.5–20 | 0.8–5 |
| Hydrogen ratio, M s.c.f./b | 0.5–20 | 4–12 |

The above conditions should be suitably correlated so as to reduce the organic nitrogen content of the feed to below about 60, and preferably below 25, parts per million.

The effluent from hydrofiner 8 is withdrawn through line 10 and transferred via heat exchanger 12 to first-stage hydrocracker 14, in which is disposed a bed or beds of the rare earth X type hydrocracking catalyst. Heat exchanger 12 serves either to heat or cool the hydrofiner effluent, depending upon the desired temperature differential between the outlet of hydrofiner 8 and the inlet of hydrocracker 14. It will be apparent that the feed to hydrocracker 14 will contain all of the nitrogen and sulfur which was present in the initial feed, nearly all of which will have been converted to ammonia and hydrogen sulfide in hydrofiner 8.

The hydrocracking conditions to be employed in hydrocracker 14 will depend upon the refractoriness of the feed, its nitrogen content, and the desired conversion per pass, as well as the relative activity of the catalyst. In general, for feeds containing (before hydrofining) from 0.01% to 2% of nitrogen, suitable hydrocracking conditions may be selected within the following ranges:

FIRST-STAGE HYDROCRACKING CONDITIONS

| | Broad range | Preferred range |
|---|---|---|
| Average bed temp., °F.: | | |
| Start of run | 600–750 | 650–750 |
| End of run | 650–875 | 750–850 |
| Pressure, p.s.i.g. | 500–4,000 | 1,000–3,000 |
| LHSV, v./v./hr | 0.5–10 | 0.8–5 |
| $H_2$/oil, M s.c.f./b | 0.5–20 | 4–12 |

The above conditions, particularly temperature and space velocity, are suitably adjusted and correlated so as to provide about 30–70 volume-percent conversion to products boiling below the initial boiling point of the feedstock. The pressure is preferably not more than about 200 p.s.i. above or below the pressure in the hydrofiner.

The effluent from hydrocracker 14 is withdrawn via line 16, condensed in condenser 18, then mixed with wash water injected via line 20 into line 22, and the entire mixture is then transferred to high-pressure separator 24. Sour recycle hydrogen is withdrawn via line 26, and aqueous wash water containing dissolved ammonia and some of the hydrogen sulfide is withdrawn via line 28. The liquid hydrocarbon phase in separator 24 is then flashed via line 30 into low-pressure separator 32, from which flash gases comprising methane, ethane, propane and the like are withdrawn via line 34. The liquid hydrocarbons in separator 32 are then transferred via line 36 to fractionating column 38.

In fractionating column 38, the $C_4{}^+$ hydrocarbon condensate is fractionated so as to recover overhead via line 40, a gasoline product boiling up to about 350–400° F., and a gas oil bottoms fraction via line 42. The gas oil bottoms fraction is treated according to one of three major alternate schemes, designated as A, B, or C.

According to alternate A, it is recycled via lines 44 and 46 back to hydrocracker 14 for further conversion to gasoline. This results in a single-stage hydrocracking process which requires none of the additional equipment illustrated. The single-stage operation is desirable for small units, and/or where the initial feed is relatively low in nitrogen and is otherwise non-refractory. It is normally disadvantageous, however, for large-scale operations, because the efficiency of conversion to gasoline is lower in a single-stage process.

According to alternate B, which provides another type of single-stage operation, the unconverted oil in line 42, or a portion thereof, is recycled via lines 44 and 48 to hydrofiner 8. This modification is useful primarily in cases where a highly aromatic feedstock is employed, and it is desired to prevent the buildup of heavy aromatic hydrocarbons in the unconverted oil. This is accomplished by subjecting the recycle oil to hydrogenation in both reactors, 8 and 14, instead of in reactor 14 only as in alternate A.

To provide for maximum economy and efficiency in large-scale operations, alternate C may be utilized. In this alternate, the bottoms fraction from column 38 is diverted into line 50, blended with fresh and recycle hydrogen from line 52, and the mixture is then passed to second-stage hydrocracker 54 via preheater 56. The oil which is thus treated in hydrocracker 54 is considerably less refractory than the feed which was treated in the first-stage hydrocracker, and is free of ammonia. Hence, it is found that lower temperatures can normally be maintained in the second-stage hydrocracker than in the first stage. Here again the hydrocracking is initiated with fresh catalyst at a suitably low temperature, and the temperature is gradually raised over a period of several months to maintain relatively constant conversion, preferably about 40 to 80% per pass to 400° F. end-point gasoline.

The hydrocracking conditions to be employed in the second stage will depend mainly upon the activity of the catalyst, the desired conversion per pass, the boiling range of the feed, and the particular products desired. In general, suitable operating conditions may be selected within the following ranges:

SECOND-STAGE HYDROCRACKING CONDITIONS

| | Broad range | Preferred range |
|---|---|---|
| Average bed temp., ° F.: | | |
| Start of run | 450–750 | 500–650 |
| End of run | 600–875 | 725–850 |
| Pressure, p.s.i.g | 500–4,000 | 1,000–3,000 |
| LHSV, v./v./hr | 1.0–20 | 2–12 |
| H$_2$/oil, M s.c.f./b | 0.5–20 | 4–12 |

Effluent from hydrocracker 54 is withdrawn via line 58, condensed in condenser 60, and transferred to high-pressure separator 62, from which hydrogen-rich recycle gas is withdrawn via line 64. High-pressure condensate in separator 62 is flashed via line 66 into low-pressure separator 68, from which light hydrocarbon gases are exhausted via line 70. Liquid condensate in separator 68 is then transferred via lines 72 and 36 to fractionating column 38 for recovery of the second-stage gasoline product along with the first-stage gasoline.

(B) *Hydrocracking catalyst.*—The basic raw material for the rare earth X zeolite catalysts for use in first-stage hydrocracker 14 is sodium zeolite X, described in U.S. Patent No. 2,882,244, having the general formula, $$Na_2O:Al_2O_3:xSiO_2:yH_2O$$

wherein $x$ is about $2.5\pm0.5$ and $y$ may vary from about 4 to 8. The sodium zeolite may be converted to the desired rare earth form by conventional direct ion exchange procedures with solutions of rare earth metal salts. This procedure however is somewhat disadvantageous in that it is difficult to remove more than about 75% of the zeolitic sodium by direct exchange with polyvalent metals. This difficulty can be overcome by first exchanging the sodium zeolite with ammonium salt solutions to prepare an ammonium zeolite of desired low sodium content (preferably less than 1.5% Na$_2$O), and then back-exchanging the ammonium zeolite with rare earth metal salt solutions. Polyvalent metal ions, it is found, will more readily displace zeolitic ammonium ions than zeolitic sodium ions. Somewhat the same effect can be obtained by using a mixed solution of ammonium salts and rare earth metal salts.

The ion-exchange procedure is normally carried out by simply contacting the zeolite with solutions of the desired salt or salts in a solvent which is generally water, but may also comprise other ionizing solvents such as lower alcohols, ketones, ethers, dimethyl formamide, and the like. Generally, the exchange is carried out at a pH of about 3.0 to 9.0, and at temperatures between about 0° and 100° C., elevated temperatures usually being preferred because they tend to accelerate the exchange reaction. The contacting may be carried out either batch-wise or in a continuous manner by percolating the desired solutions through a bed of the zeolitic material.

A wide variety of compounds can be employed as the source of rare earth ions. Operable compounds include rare earth chlorides, bromides, sulfates, acetates, benzoates, citrates, nitrates, formates, propionates and the like. The principal limitation on the particular salt or salts employed is that it be sufficiently soluble in the fluid medium in which it is used to give the necessary rare earth ion transfer. The preferred rare earth salts are the chlorides, nitrates and sulfates.

Representative of the rare earth metals are lanthanum, cerium, praseodymium, neodymium, samarium, europium, gadolinium, terbium, dysprosium, holmium, erbium, thulium, scandium, yttrium, and lutecium.

Either a single rare earth metal or mixtures thereof may be employed. In view of the difficulty in separating rare earth metal salts mixtures thereof are generally employed. Such mixtures normally comprise the chlorides of lanthanum, cerium, neodymium and praseodymium with minor amounts of samarium, gadolinium and yttrium. Mixed rare earth chlorides are commercially available having the relative composition cited in the example following hereinafter. Didymium chloride is also a mixture of rare earth chlorides, but having a lower cerium content (1–2% by weight as oxide). It is to be understood that other mixtures of rare earths are also applicable for the preparation of the catalysts of this invention, although lanthanum, cerium, neodymium, praseodymium, samarium, and gadolinium as well as mixtures thereof are preferred since these metals provide optimum activity for hydrocarbon conversion, including catalytic hydrocracking.

Suitable ammonium compounds which may be employed to introduce zeolite ammonium ions include ammonium chloride, ammonium bromide, ammonium sulphate, ammonium acetate, ammonium nitrate, and the like. In addition to inorganic ammonium compounds, the various substituted tetra-alkyl ammonium salts may be employed such as tetramethyl ammonium chloride and the like.

The foregoing ion exchange procedures are suitably controlled so as to produce a final zeolite wherein the zeolitic cation ratios are as follows, in terms of equivalents per mole of Al$_2$O$_3$ in the anionic structure of the crystalline zeolite:

| | Broad range | Preferred range |
|---|---|---|
| Rare Earth, (RE)$^{+++}$ | 1.4–2.0 | 1.5–1.8 |
| NH$_4$ | 0–0.4 | 0.05–0.3 |
| Na$^+$ | 0–0.4 | 0–0.2 |

The preferred zeolites, in their anhydrous state therefore correspond to the general formula:

$$[Na_2O]_a[(NH_4)_2O]_b[(RE)_2O_3]_c[Al_2O_3][SiO_2]_x$$

wherein $a$ is about 0–0.1, $b$ is about 0–0.15, $c$ is about 0.25 to 0.30, and $x$ is about 2.5.

Hydrogenation activity is imparted to the rare earth zeolite base by adding a minor proportion, e.g. 0.01 to 20% by weight, of one or more of the Group VIII metals, preferably a Group VIII noble metal. Specifically, it is preferred to employ about 0.1% to 3% by weight of a noble metal, e.g. palladium, platinum, rhodium, ruthenium or iridium. These metals may be added by impregnation of the powdered or pelleted zeolite, but preferably they are added by ion exchange to the powdered zeolite during, or directly after the addition of rare earth metal ions, i.e., before the zeolite is calcined to activate the same.

To incorporate the Group VIII metals by ion exchange, the rare earth metal zeolite, preferably still in a hydrous form, is digested with an aqueous solution of a suitable compound of the desired metal wherein the metal is present in a cationic form. Suitable Group VIII noble metal compounds include for example palladium tetrammine chloride, platinum tetrammine chloride, and the like. Preferably, fairly dilute solutions of the Group VIII metal salts are employed, and there will be a substantially quantitative exchange of ammonium and/or rare earth metal by the Group VIII metal ion.

The catalyst powders prepared as above described are then compressed or extruded into pellets of the desired size, generally ranging between about 1/16″ and 3/8″. Suitable binders or lubricants such as hydrogenated corn oil, graphite and the like may also be added. In addition, the catalyst powders may also be admixed with various inorganic, porous, powdered adjuvants which (1) are chemically stable at temperatures up to about 1,200° F., (2) are inert with respect to the catalyst component, and (3) have an average pore diameter greater than about 20 A., preferably 50–150 A. These adjuvants may be used in any desired proportion ranging between about 10% and 90% by weight of the total composition. The optimum proportion of adjuvant depends upon several factors, principally the relative activity of the zeolite component and its particle size. Small microcrystalline zeolites having high intrinsic catalytic activity tend to produce diffusion-limited pellets, and in these cases a substantially greater efficiency of catalyst utilization is obtained by copelleting the zeolite catalyst with the relatively inert adjuvants.

Suitable adjuvants include for example activated alumina, silica gel, alumina-silica cogels containing about 1–30% by weight of $SiO_2$, silica-alumina cogels containing 50–90% of $SiO_2$, magnesia, titania, zirconia, clays (preferably acid washed), rare earth oxides, chromium oxides, and the like. These materials may either be employed as such, or a minor proportion of a Group VIII metal hydrogenating component may be impregnated thereon.

The pelleted catalyst composition is finally subjected to a calcining and activation treatment by heating at temperatures of e.g. 700–1,300° F. for one-half to several hours. This calcination decomposes any remaining zeolitic ammonium ions, leaving in their place hydrogen ions, and simultaneously brings about suitable dehydration.

The catalyst employed in second-stage hydrocracker 54 may be any of those described above for use in hydrocracker 14. However, in view of the substantial absence of nitrogen compounds in the second-stage, a much wider choice of more economical catalysts is presented. If desired, conventional amorphous type catalysts may be employed. These amorphous catalysts may comprise a minor proportion of a Group VI-B and/or Group VIII metal deposited upon co-precipitated composites of silica-alumina, silica-magnesia, silica-zirconia, alumina-boria, silica-titania, silica-zirconia-titania; acid treated clays and the like, acidic metal phosphates such as aluminum phosphate may also be employed. Any of these amorphous catalysts may be further activated by the addition of a minor proportion of an acidic halide such as HF, $BF_3$, $SiF_4$, or the like.

Preferably however, the second-stage catalyst is a crystalline hydrogen zeolite promoted as described above with a minor proportion of a Group VIII metal hydrogenating component, preferably a noble metal. Suitable zeolites for use in their hydrogen forms are those having a relatively high $SiO_2/Al_2O_3$ mole-ratio of about 3.0 to 12, preferably 4–6, and having crystal pore diameters in the range of about 6–14 A. Preferred examples of such zeolites are the synthetic molecular sieves of the Y and L crystal types, natural and synthetic mordenite, chabazite, faujasite and the like. These zeolites can be converted to stable hydrogen forms by first converting them to an ammonium form followed by heating to decompose zeolitic ammonium ions, as described for example in U.S. Patent No. 3,130,006.

The preferred hydrogen zeolites are those wherein the zeolitic cation ratios are as follows, in terms of equivalents per mole of $Al_2O_3$ in the anionic structure of the zeolite:

|  | Broad range | Preferred range |
| --- | --- | --- |
| H+ | 0.5–2 | 0.8–1.8 |
| Na+ | 0–0.5 | 0–0.2 |
| Polyvalent metals | 0–1.5 | 0.2–1.0 |

Suitable polyvalent metals include the rare earth metals, the alkaline earth metals, e.g. magnesium and calcium, the Group II-B metals, e.g. zinc and cadmium, the Iron Group metals, e.g. nickel and cobalt, the Group VII-B metals, e.g. manganese, or the like. A small proportion of polyvalent metal is preferred in the case of Y zeolites in order to stabilize the hydrogen form against hydrothermal degradation, but it should be noted that large proportions are not required as in the case of X zeolite. The mixed polyvalent metal-hydrogen zeolites may be prepared as described in U.S. Patent No. 3,140,252.

(C) *Feedstocks*.—The feedstocks which may be treated herein include in general any nitrogen-containing mineral oil fraction boiling about about 150° F., and usually above about 400° F., and having an end-boiling point up to about 1,200° F. This includes straight-run gas oils and naphthas, coker distillate gas oils and naphthas, desaphalted crude oils, cycle oils derived from catalytic or thermal cracking operations and the like. These fractions may be derived from petroleum crude oils, shale oils, tar sand oils, coal hydrogenation products and the like. Specifically, it is preferred to employ feedstocks boiling between about 400° and 900° F., having an API gravity of 20 to 35°, and containing at least about 30% by volume of acid-soluble components (aromatic + olefins). Organic nitrogent contents may range between 100 and 5,000 p.p.m. preferably between about 100 and 2,00 p.p.m. Sulfur compounds may also be present.

The following examples are cited to illustrate the invention, but are not to be construed as limitng in scope:

Example I

This example illustrates suitable conditions and results obtainable in a hydrocracking run using the two-stage contacting technique illustrated in the drawing, with all recycle oil being sent to the second stage, alternate C). The feedstock is a blend of catalytic cracking crude oil and straight-run and coker distillate gas oils, the principal characteristics of which are as follows:

| | |
| --- | --- |
| Boiling range, ° F. | 400–850 |
| Gravity, ° API | 22 |
| Sulfur content, wt. percent | 1.1 |
| Nitrogen content, wt. percent | 0.18 |
| Wt. percent aromatics | 40 |

The feed is passed first over a hydrofining catalyst consisting of the sulfided equivalent of 3% nickel oxide and 15% molybdenum oxide, supported by an alumina carrier stabilized by the addition of about 5% $SiO_2$. Beginning-of-run hydrofining conditions are as follows:

| | |
| --- | --- |
| Temperature (av. bed), ° F. | 735 |
| Pressure, p.s.i.g | 1,500 |
| Liquid hourly space velocity | 1.25 |
| Hydrogen/oil ratio, s.c.f/b. | 10,000 |

Under these conditions, total organic nitrogen content of the resulting hydrofined oil is about about 8–10 p.p.m. The total hydrofining effluent is passed continuously into a first-stage hydrocracking reactor filled with a catalyst comprising 0.5% palladium ion-exchanged into a rare earth X zeolite substantially identical to catalyst A described below in Example II.

The effluent from the first stage of hydrocracking is condensed while simultaneously washing with water to remove ammonia. Hydrogen-rich recycle gas is recovered and recycled to the hydrofining step. The liquid condensate is fractionated to recover the first-stage gasoline product boiling up to about 400° F. The residue of oil boiling above 400° F. is then passed through the second hydrocracking reactor, which is filled with a catalyst comprising 0.5% palladium ion exchanged onto a magnesium-hydrogen form of a Y zeolite having a $SiO_2/Al_2O_3$ mole-ratio of 4.7 and a $MgO/Al_2O_3$ mole-ratio of 0.4. The product effluent is fractionated to recover 400° F. end-point gasoline, the residue being recycled back to the second stage. Start-of-run conditions in the first and second hydrocracking stages are as follows:

| | First stage | Second stage |
| --- | --- | --- |
| Temperature, ° F. (av. bed) | 710 | 600 |
| Pressure, p.s.i.g. | 1,500 | 1,500 |
| Liquid hourly space velocity | 1.7 | 2.0 |
| $H_2$/Oil ratio, s.c.f./b. | 10,000 | 8,000 |
| Conversion per pass to 400° F. end-point material | 40 | 60 |

Product distribution and yields under the above conditions are approximately as follows:

| | |
|---|---|
| Dry gas make ($C_1$–$C_3$) s.c.f./b. | 110 |
| Fresh feed | 110 |
| Liquid yields, vol. percent of fresh feed: | |
|   Butanes | 14 |
|   Pentanes | 13 |
|   $C_6$ | 15 |
|   $C_7$–400° F. gasoline | 82 |
|     Total $C_4$–400° F. gasoline | 124 |

Operation as described above can be contained for a total run length of at least about 6 months, and normally at least about 12 months, by periodically raising temperatures in the respective reactors an average of about 0.01° to 1° F. per day to compensate for catalyst deactivation while maintaining the specified conversion levels.

Example II

This example demonstrates the superior initial hydrocracking activity of rare earth X zeolites, as compared to calcium X or magnesium-hydrogen zeolites.

Catalyst A was prepared by ion exchanging the sodium form of an X-zeolite with a mixture of rare-earth ions and ammonium ions in aqueous solution. The exchange solution was 0.14 molar in rare earth chlorides and 0.37 molar in ammonium chloride. The amount of solution used for each exchange was equivalent to one-half of the exchange capacity of the zeolite, i.e., the total exchangeable cations in the solution were equivalent to one-half the exchangeable cations in the zeolite. Twelve such exchanges were made for 2 hours each at 180° F. Analysis of the resulting exchanged zeolite showed the following empirical formula:

$0.002Na_2O \cdot 0.11(NH_4)_2O \cdot 0.29(RE)_2O_3 \cdot Al_2O_3 \cdot 2.35SiO_2$ This was derived from the analysis on an anhydrous basis which was as follows:

| | Percent by weight |
|---|---|
| $Na_2O$ | 0.30 |
| $(NH_4)_2O$ | 1.8 |
| $(RE)_2O_3$ | 27.9 |
| $SiO_2$ | 40.8 |
| $Al_2O_3$ | 29.5 |

(RE=Mixture of rare earths.)

The exchanged product was loaded with 0.5% by weight of palladium by ion-exchanging with $Pd(NH_3)_4Cl_2$, dried, pelleted into ⅛″ x ⅛″ pellets, and calcined in dry air at 1,000° F. for 12 hours.

The composition of the rare earth chlorides used in the above preparation was as follows:

| | Percent |
|---|---|
| $CeCl_3 \cdot 6H_2O$ | 43.5 |
| $LaCl_3 \cdot 6H_2O$ | 23.0 |
| $NdCl_3 \cdot 6H_2O$ | 17.9 |
| $PrCl_3 \cdot 6H_2O$ | 5.4 |
| $SmCl_3 \cdot 6H_2O$ | 1.9 |
| $GdCl_3 \cdot 6H_2O$ | 0.6 |
| $YCl_3$ and other rare earths | 0.2 |

The remaining salts include chlorides of aluminum, calcium, sodium, and magnesium.

Catalyst B was prepared by ion exchanging the sodium form of Y-zeolite first with a 25% solution of ammonium chloride at 180° F. The amount of solution taken for each exchange contained about 6.5 equivalents of exchangeable ammonium ion based on the amount of initial sodium zeolite taken. Five such exchanges were required to reduce the sodium content to 1.5 weight-percent $Na_2O$. The exchanged product was then back-exchanged with $MgSO_4$ solution until about 40% of the ion-exchange capacity was satisfied with magnesium. The composition of this product corresponded to the following empirical formula:

$0.10Na_2O \cdot 0.4MgO \cdot 0.5(NH_4)_2O \cdot Al_2O_3 \cdot 4.8SiO_2$

This product was then loaded with 0.5% by weight of palladium by exchange with $Pd(NH_3)_4Cl_2$, dried, pelleted, and calcined at 1,000° F. in dry air for 12 hours.

Catalyst C was prepared in essentially the same manner as catalyst B, except that an X molecular sieve zeolite was used instead of the Y zeolite, and a calcium chloride solution was employed instead of magnesium sulfate for the metal ion exchange. The resulting calcium-ammonium zeolite, prior to the addition of 0.5% palladium, showed the following empirical formula:

$0.02Na_2O \cdot 0.76CaO \cdot 0.14(NH_4)_2O \cdot Al_2O_3 \cdot 2.31SiO_2$

The cation deficiency of 0.08 mole can be ascribed to hydrogen ion introduced during the exchange, so that the fraction of sites satisfied by hydrogen ion after decomposition of the $(NH_4)_2O$ is 0.22 or 22%.

Comparison of activities.—Each of the foregoing catalysts were then tested for hydrocracking activity using a hydrofined gas oil having the following properties:

| | |
|---|---|
| Boiling range, ° F. | 390–860 |
| Gravity, ° API | 34.7 |
| Aniline point, ° F. | 170 |
| Nitrogen, total, p.p.m. | 0.7 |
| Sulfur, p.p.m. | 60 |
| Acid solubility, percent | 22 |

The conditions of the test were as follows:

| | |
|---|---|
| Pressure, p.s.i.g. | 1,000 |
| Temperature, as required for 55% conversion. | |
| Liquid hourly space velocity | 1.5 |
| $H_2$/oil ratio, s.c.f./barrel | 8,000 |

In one series of tests, the hydrofined feedstock was used as such (being essentially free of nitrogen), and then in a second series of tests, 1,900 p.p.m. of nitrogen was added to the feed as t-butylamine in order to determine the relative tolerance of the catalysts for nitrogen. The results of the tests were as follows:

| | Temperature, ° F., required for 55% conversion | |
|---|---|---|
| Catalyst | Nitrogen-free feed | High-nitrogen feed |
| A/(Pd-H-RE-X) | 473° at 30 hours<br>501° at 75 hours | 683° at 40 hours.[1] |
| B/(Pd-H-Mg-Y) | 508° at 30 hours<br>513° at 75 hours | 714° at 40 hours.[2] |
| C/(Pd-H-Ca-X) | 710° at 40 hours | 832° at 100 hours.[3] |

[1] Plus 190 preceding hours on nitrogen-free feed.
[2] Plus 75 preceding hours on nitrogen-free feed.
[3] Conversion was only 40%, and catalyst was rapidly deactivating (6-7° F. per day).

The foregoing data shows that the rare earth zeolite catalyst A was initially more active than a corresponding calcium X zeolite catalyst, or even a corresponding hydrogen-magnesium-Y zeolite catalyst, and this superior activity was particularly pronounced in reference to the high-nitrogen feedstocks.

Example III

The data in Example II would appear to indicate that the rare earth X zeolite catalyst is superior to the hydrogen Y type catalyst for all purposes. However, the data in this example will show that, over a period of time, the rare earth X catalyst maintains its superior activity over corresponding Y zeolite catalysts only in respect to hydrocracking carried out in the presence of ammonia, and tends to decline to a lower activity level than the Y-type catalyst when the hydrocracking is carried out in the absence of ammonia.

Catalyst A of Example II was tested for hydrocracking activity over an extended run of 290 hours, using the same feed and conditions described in Example II. During the last 70 hours of the run, 0.19 weight-percent of nitrogen was added to the feed as tert butylamine. A parallel run was carried out under the same conditions using a corresponding rare-earth Y zeolite catalyst, D, corresponding to the formula:

$$0.11Na_2O \cdot 0.25(RE)_2O_3 \cdot 0.14H_2O \cdot Al_2O_3 \cdot 5SiO_2$$

upon which was ion-exchanged 0.5 weight-percent of palladium. The results of the runs were as follows:

| Hours on stream | Temperature, °F., required for 55% conversion | |
|---|---|---|
| | Catalyst A/Pd-RE-H-X | Catalyst D/Pd-RE-H-Y |
| 30 | 473 | 487 |
| 40 | 480 | 488 |
| 50 | 486 | 490 |
| 60 | 492 | 492 |
| 70 | 498 | 494 |
| 80 | 503 | 497 |
| 90 | 509 | 499 |
| 100 | 513 | 501 |
| 110 | 517 | 503 |
| 120 | 520 | 505 |
| | | With 0.19% N added to feed |
| 120 | 520 | 682 |
| 130 | 522 | 686 |
| 140 | 524 | 689 |
| 150 | 525 | 693 |
| 160 | 527 | 697 |
| 170 | 528 | 701 |
| 180 | 528.5 | |
| 190 | 529 | |
| | With 0.19% N added to feed | |
| 220 | 681 | |
| 230 | 683 | |
| 240 | 684 | |
| 250 | 685 | |
| 260 | 685.5 | |
| 270 | 686 | |
| 280 | 686 | |
| 290 | 686 | |

From the foregoing data it is evident that:

(1) The X zeolite catalyst was initially more active than the Y for hydrocracking the nitrogen-free feed;

(2) At 60 hours, the two catalysts had achieved identical activities, due to the more rapid rate of deactivation of the X catalyst;

(3) From 60 hours to 120 hours the Y zeolite catalyst continued to show a lower deactivation rate than the X catalyst;

(4) At 220 hours the X zeolite catalyst showed equal or superior activity for hydrocracking a nitrogen-containing feed, as compared to the Y zeolite catalyst at only 120 hours;

(5) After only 50 hours on the nitrogen-containing feed, the X catalyst activity levelled out at 686° F., whereas at the same point the Y catalyst required a temperature of 701° F., which was still rising at a period rate of about 8–10° F. per day.

From all the foregoing, it is evident that the relative activities of the rare earth X, and the rare earth Y zeolite catalysts are reversed for nitrogen-containing vs nitrogen-free feeds. Hence the desirability of using the X type catalyst in the first stage of my process and the Y type in the second stage.

It is not intended that the invention should be limited to the details described above. The following claims and the obvious equivalents thereof are intended to define the true scope of the invention.

I claim:

1. A process for hydrocracking a mineral oil feed stream contaminated with an amount of ammonia equivalent to at least about 100 parts per million of nitrogen based on feed, which comprises subjecting said ammonia-containing feed stream to catalytic hydrocracking at an elevated temperature and pressure in the presence of hydrogen and a hydrocracking catalyst comprising a minor proportion of a Group VIII metal hydrogenating component deposited upon an X zeolite cracking base wherein the zeolitic cation equivalent comprises mainly rare earth metal ions, and recovering desired low-boiling hydrocarbons from the resulting hydrocracked effluent.

2. A process as defined in claim 1 wherein said Group VIII metal hydrogenating component is a noble metal.

3. A process as defined in claim 1 wherein said Group VIII metal hydrogenating component is palladium.

4. A process as defined in claim 1 wherein said X zeolite cracking base comprises between about 1.4 and 2.5 equivalents of zeolitic rare earth metal ions per mole of $Al_2O_3$ in the anionic structure of the crystalline zeolite.

5. A process as defined in claim 1 wherein said desired low-boiling hydrocarbons comprise gasoline, and said feed stream comprises gas oil.

6. A mineral process for producing low-boiling hydrocarbons from a higher boiling oil feedstock containing organic nitrogen compounds equivalent to at least about 100 parts per million of nitrogen, which comprises:

(1) subjecting said feedstock to catalytic hydrofining in the presence of added hydrogen and a hydrofining catalyst at an elevated temperature and pressure to effect decomposition of said organic nitrogen compounds with resultant formation of ammonia;

(2) subjecting ammonia-containing effluent from said hydrofining step, without intervening purification, to catalytic hydrocracking at an elevated temperature and pressure in the presence of hydrogen and a hydrocracking catalyst comprising a minor proportion of a Group VIII metal hydrogenating component deposited upon an X zeolite cracking base wherein the zeolitic cation equivalent comprises mainly rare earth metal ions; and (3) recovering desired low-boiling hydrocarbons from the effluent from said hydrocracking step.

7. A process as defined in claim 6 wherein said Group VIII metal hydrogenation component is a noble metal.

8. A process as defined in claim 6 wherein said Group VIII metal hydrogenation component is palladium.

9. A process as defined in claim 6 wherein said X zeolite cracking base comprises between about 1.4 and 2.5 equivalents of zeolitic rare earth metal ions per mole of $Al_2O_3$ in the anionic structure of the crystalline zeolite.

10. A process as defined in claim 6 wherein the major product recovered in step (3) is gasoline.

11. A process for producing gasoline from a heavy gas oil feedstock boiling above about 400° F. and containing organic nitrogen compounds equivalent to at least about 100 parts per million of nitrogen, which comprises:

(1) subjecting said feedstock to catalytic hydrofining in the presence of hydrogen and a hydrofining catalyst at an elevated pressure and temperature, correlated to effect a substantial decomposition of organic nitrogen compounds with resultant formation of ammonia;

(2) subjecting total effluent from said hydrofining step, without intervening purification to remove ammonia, to a first stage of catalytic hydrocracking at an elevated temperature and pressure, and at a space velocity correlated to give a substantial conversion to gasoline, in the presence of a hydrocracking catalyst comprising a minor proportion of a Group VIII metal hydrogenating component deposited upon an X zeolite cracking base wherein the zeolitic cation equivalent comprises mainly rare earth metal ions;

(3) recovering gasoline and a substantially ammonia-free unconverted oil from the effluent from said first-stage hydrocracking step;

(4) subjecting said unconverted oil to a second stage of catalytic hydrocracking at an elevated temperature and pressure in the presence of hydrogen and hydrocracking catalyst comprising a minor proportion of a Group VIII metal hydrogenating component deposited upon a Y zeolite cracking base wherein the zeolite cation equivalent comprises mainly hydrogen ions and/or polyvalent metal ions; and (5) recovering gasoline from the effluent from said second-stage hydrocracking.

12. A process as defined in claim 11 wherein the Group VIII metal hydrogenation component in each of said hydrocracking catalysts is a noble metal.

13. A process as defined in claim 11 wherein the Group VIII metal hydrogenation component in each of said hydrocracking catalysts is palladium.

References Cited

UNITED STATES PATENTS

| | | | |
|---|---|---|---|
| 3,405,056 | 10/1968 | Vagll et al. | 208—111 |
| 3,173,854 | 3/1965 | Eastwood et al. | 208—111 |
| 3,256,177 | 6/1966 | Tulleners et al. | 208—89 |
| 3,384,572 | 5/1968 | Myers et al. | 208—111 |

PAUL M. COUGHLAN, Jr., Primary Examiner

T. H. YOUNG, Assistant Examiner

U.S. Cl. X.R.

208—89

UNITED STATES PATENT OFFICE
CERTIFICATE OF CORRECTION

Patent No. 3,499,835                    Dated   March 10, 1970

Inventor(s)  Rowland C. Hansford

It is certified that error appears in the above-identified patent and that said Letters Patent are hereby corrected as shown below:

Column 12, lines 17 and 18, "A mineral process for producing low-boiling hydrocarbons from a higher boiling oil feedstock" should read -- A process for producing low-boiling hydrocarbons from a higher boiling mineral oil feedstock --.

SIGNED AND SEALED
AUG 25 1970

(SEAL)
Attest:

Edward M. Fletcher, Jr.
Attesting Officer

WILLIAM E. SCHUYLER, JR.
Commissioner of Patents